United States Patent
Gross et al.

[11] Patent Number: 5,149,574
[45] Date of Patent: Sep. 22, 1992

[54] LAMINATES OF IMPROVED EDGE STABILITY

[75] Inventors: Bernd Gross, Grossniedesheim; Heinz Weber, Gruenstadt; Georg Schuon, Laupheim, all of Fed. Rep. of Germany

[73] Assignee: BASF Aktiengesellschaft, Ludwigshafen, Fed. Rep. of Germany

[21] Appl. No.: 639,096

[22] Filed: Jan. 9, 1991

[30] Foreign Application Priority Data

Jan. 25, 1990 [DE] Fed. Rep. of Germany ....... 4002067

[51] Int. Cl.$^5$ ............................................. B32B 3/00
[52] U.S. Cl. ..................................... 428/116; 428/76; 428/286; 428/474.4
[58] Field of Search ............. 428/116, 76, 286, 474.4, 428/332, 337

[56] References Cited

U.S. PATENT DOCUMENTS 3,211,253 10/1965 Gonzalez ............................ 428/116
4,606,959 8/1986 Hillinger ............................ 428/116

FOREIGN PATENT DOCUMENTS 154618 9/1985 European Pat. Off. ........... 428/116
0313171 4/1989 European Pat. Off. .
9014943 12/1990 Fed. Rep. of Germany ...... 428/116

Primary Examiner—Patrick J. Ryan
Assistant Examiner—Kam F. Lee
Attorney, Agent, or Firm—Oblon, Spivak, McClelland, Maier & Neustadt

[57] ABSTRACT

Laminates of improved edge strength have a foam or honeycomb core layer A comprising a heat resistant plastic and cover layers B comprising fiber reinforced heat resistant plastic, at least one edge of the core layer being joined to a foam strip C of a heat resistant thermoplastic material whose density is higher than the density of the core.

6 Claims, 1 Drawing Sheet

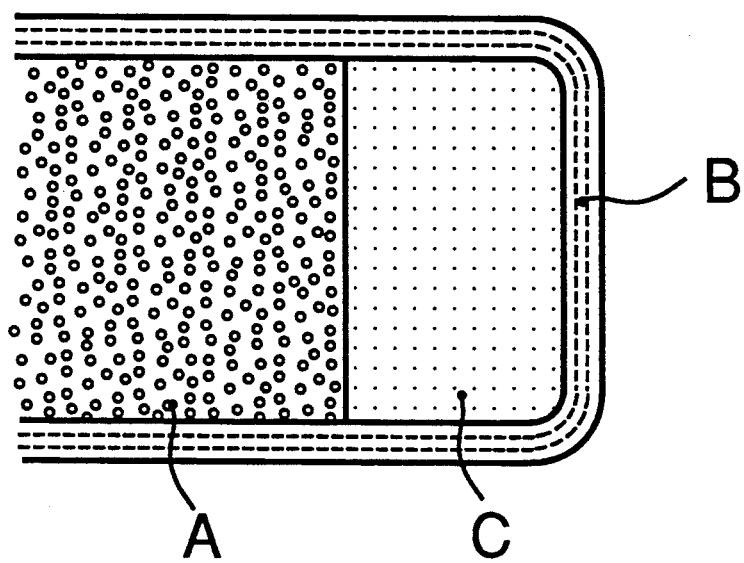

LAMINATES OF IMPROVED EDGE STABILITY

The present invention relates to laminates formed from a foam or honeycomb core layer of a heat resistant plastic and at least one cover layer of a fiber reinforced heat resistant plastic.

Sandwich composite elements or laminate sheets with a foam core and fiber reinforced cover layers are known, for example from EP-A-313,171. They find utility in particular as structural elements in the interiors of aircraft. The problem with such structural components is their low edge stability, which is not even sufficient when the cover layer is guided around the edges of the foam core.

It is an object of the present invention to improve the edge stability of laminates composed of a foam core and fiber reinforced cover layers.

We have found that this object is achieved according to the present invention when the edges of the core layer are reinforced with a foam strip of a heat resistant plastic.

The present invention accordingly provides a laminate of improved edge stability formed from A. a foam or honeycomb core layer from 30 to 150 kg.m$^{-3}$ in density composed of a heat resistant thermoplastic or thermoset material a, B at least one cover layer composed of a fiber reinforced heat resistant thermoplastic or thermoset material b, wherein at least one edge of the core layer is joined to a foam strip C from 200 to 1000 kg.m$^{-3}$ in density composed of a heat resistant thermoplastic material c.

The FIGURE shows a diagram of the laminate according to the present invention.

The foam or honeycomb core layer A has a density of from 30 to 150, preferably from 40 to 80, kg.m$^{-3}$. It consists of a heat resistant plastic a. Preference is given to foam core layers made of thermoplastics, in particular polyether sulfones

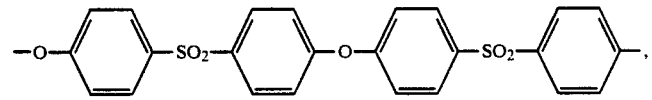

polysulfones

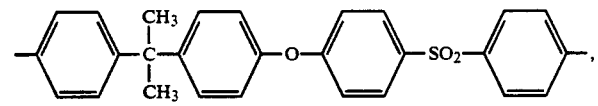

polyether imides

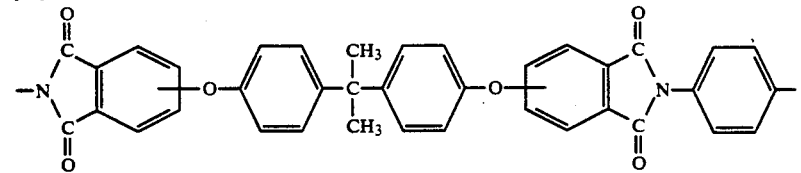

and polyamides, e.g. nylon 6, nylon 6.6, nylon 4.6 and (partly) aromatic polyamides.

Besides these it is also possible to use thermoplastic polyimides, polyether imides, polycarbonate, polyphenylene sulfide and polyphenylene ethers, and copolymers and mixtures thereof. Suitable thermosetting plastics are for example epoxy resins and phenol/formaldehyde and melamine/formaldehyde resins.

The core layer may also have a honeycomb structure and be made of a phenol-impregnated aromatic polyamide.

The plastics should have a DIN 53 461 (B) heat resistance of more than 130° C., preferably more than 160° C.

The core layer is preferably from 4 to 40 mm, in particular from 5 to 20 mm, in thickness.

The fiber reinforced cover layer B is unfoamed. Suitable plastics are the same thermoplastics and thermosets b as for the core layer. Suitable fibers are those made of glass, carbon and aromatic polyamide. The fibers may be in the form of weaves, knits, mats or unidirectional bundles. Preference is given to woven glass fiber fabrics. The resin content is in general in the range from 20 to 60% by weight.

The thickness of the cover layer is preferably from 0.1 to 1.5 mm, in particular from 0.2 to 0.6 mm.

The laminates with core and cover layers are produced in a conventional manner, for example by pressing together at temperatures above the softening point of the thermoplastic material or at the curing temperature of the thermosetting plastic of the cover layer. In some cases, it is also possible to use adhesive films. This is in fact necessary with most thermosetting plastics. In the case of thermoplastics, the materials of the adhesive films should be compatible with the plastics of the core or cover layer, and preferably the two thermoplastic materials are of the same type. It is also preferable for both sides of the core layer A to be bonded to a cover layer B, but in some cases one side of the core layer may also be uncovered or be bonded to a different material.

According to the present invention, at least one edge of the core layer is joined to a foam strip C composed of a heat resistant thermoplastic material c. The density of the strip is comparatively high to ensure adequate hardness and stiffness.

It ranges from 200 to 1000 kg.m$^{-3}$, preferably from 300 to 800 kg.m$^{-3}$. The cross-section of the strip may have any desired shape, for example the shape of a semicircle, a circle segment or a rectangle, possibly with rounded or chamfered edges. Suitable heat resistant thermoplastics are again those mentioned above.

The width of strip C in the plane of the laminate is preferably from 1 to 20, in particular from 5 to 12, mm.

In principle, the foam strip C can be joined to the edge of the core layer A by welding or adhering. Preferably, however, the thermoplastic c is employed in the unfoamed state—still containing a blowing agent in the form of a strand or ribbon. This strand can be produced for example as described in DE-A-39 25 740 by extruding granules which contain a blowing agent. Preferred blowing agents are low-boiling liquids which at most have a swelling but not a dissolving effect on the thermoplastic, preferably in amounts of from 1 to 20, in particular from 2 to 10, % by weight. Suitable blowing agents are for example halogenated hydrocarbons, such as dichloromethane and chlorobenzene, ketones, such as acetone and methyl ethyl ketone, ethers, alcohols, water and mixtures thereof. In principle, it is also possible to use chemical blowing agents, such as azo compounds and carbonates.

The expandable strand is placed on the top layer against the edge of the core layer, and this assembly is then put into a mold. The mold is closed and heated to a temperature above the boiling or decomposition point of the blowing agent. The strand expands and becomes plastic (as a consequence of the lowering of the softening point of the thermoplastic c due to the blowing agent), so that the developing foamy strip C can become joined to the edge of the core A and possibly the cover layer B through adhering or coupling. It can be advantageous, before the unfoamed strand is put into the mold, to wrap the strand in part or as a whole in a film material of the cover layer B and to heat them up together, so that afterwards the strip C is likewise covered with the cover layer B. Another possibility is for the cover layer B to protrude beyond the core A in the starting laminate and the protruding part to be folded around the foamable strand.

The pressing may be combined with a shaping of the laminate, so that it may be not only planar but also vaulted, arcuate or curved and may also differ in thickness in various areas.

The laminates according to the present invention are suitable for use as structural components for the interiors of aircraft, in particular for partition walls, storage compartments or flaps for hat rests, in automotive engineering and shipbuilding, and in domestic appliances.

In the Examples, the parts and percentages are by weight.

EXAMPLE 1

A mold with internal dimensions 300×300×10 mm, made of a base plate and a detachable frame, is entered from the top with a 0.3 mm thick cover layer, 300×300 mm, comprising a glass fabric (basis weight 296 g.m$^{-2}$) impregnated with 30% of polyether sulfone. On top is placed a polyether sulfone foam (density 50 kg.m$^{-3}$, dimensions 295×295×11 mm). The outer edges of the core are surrounded with a strand of unfoamed polyether sulfone (viscosity number 59 dl.g$^{-1}$) of 10×2 mm in cross-section. This strand contains 12% by weight of methyl ethyl ketone as blowing agent; it is stable to storage over months.

The mold, covered with a metal plate, is introduced into a platen press. The base plate is heated to 240° C. and kept at that temperature for about 5 seconds. After cooling down, the molding is demolded. It comprises a sheet which is laminated on one side and which is surrounded by a smooth, strong frame of polyether sulfone foam having a density of about 800 kg.m$^{-3}$.

EXAMPLE 2

The mold described in Example 1 is entered with a glass fabric (296 g.m$^{-2}$) 350×350 mm in size impregnated with 50% by weight of uncured phenolic resin. This prepreg is pressed against the internal base and side surfaces of the mold. Then a sheet of polyether sulfone foam measuring 292×292×11 mm is introduced. The outer edges of the foam are surrounded with two expandable (12% of methyl ethyl ketone as blowing agent) round polyether sulfone strands 4 mm in diameter one on top of the other. The protruding edges of the prepreg are folded over onto the upper surface of the foam core. Then a phenolic resin prepreg measuring 290×290 mm is placed on top.

The mold, covered with a metal plate, is introduced into a platen press, heated on both sides to 150° C. and kept at that temperature for 20 minutes. After the mold has cooled down, the molding is demolded. It comprises a sheet which is laminated on all sides. Owing to the high density of the edge area (about 500 kg.m$^{-3}$) the sheet possesses considerable edge strength.

EXAMPLE 3

Example 2 is repeated, except that the foam core of polyether sulfone is replaced by one of equal size made of polyether imide 80 kg.m$^{-3}$ in density. The edges are reinforced with strands made of an expandable (15% of 7:3 dichloromethane/tetrahydrofuran as blowing agent) polyether imide (viscosity number 53 dl.g$^{-1}$).

EXAMPLE 4

Example 2 is repeated, except that a core of polyether sulfone is replaced by a 292×292×10 mm honeycomb of phenolic-impregnated polyamide (NOMEX paper) of density 48 kg.m$^{-3}$. The edges are again reinforced with expandable round strands of polyether sulfone.

We claim:
1. A laminate of improved edge stability formed from
    A. a foam or honeycomb core layer from 30 to 150 kg.m$^{-3}$ in density composed of a heat resistant thermoplastic or thermoset material,
    B. at least one cover layer composed of a fiber reinforced unfoamed heat resistant thermoplastic or thermoset material,
wherein at least one edge of the core layer is joined to foam strip C from 200 to 1000 kg.m$^{-3}$ in density composed of a heat resistant thermoplastic material.

2. A laminate as claimed in claim 1, wherein the core layer A is from 4 to 40 mm in thickness, the cover layer B is from 0.1 to 1.5 mm in thickness, and the strip C is from 1 to 20 mm in width.

3. A laminate as claimed in claim 1, wherein the plastics have a heat resistance, as defined by DIN 53 461 (B), of at least 130° C.

4. A laminate as claimed in claim 1, wherein the core layer is a foam and the plastics are thermoplastics of the same type.

5. A laminate as claimed in claim 4, wherein the thermoplastics are selected from the group consisting of polyether sulfones, polysulfones, polyether imides and polyamides.

6. A laminate as claimed in claim 1, wherein the core layer has a honeycomb structure where the honeycombs are made of a phenolic-impregnated aromatic polyamide. Drawing.

* * * * *